2,795,627

PREPARATION OF PHENYL MAGNESIUM CHLORIDE

Hugh E. Ramsden, Metuchen, N. J., assignor to Metal & Thermit Corporation, New York, N. Y., a corporation of New Jersey No Drawing. Application May 12, 1954, Serial No. 429,392

12 Claims. (Cl. 260—665)

The present invention relates to a process of preparing phenyl magnesium chloride.

Although phenyl magnesium bromide has heretofore been known and used as a reagent, its high cost has rendered its use non-attractive. Consequently, it was once believed that phenyl magnesium chloride could be prepared more economically, thereby yielding a more desirable reagent. However, because of the extreme inertness of the aromatic chloride, the usual methods of preparing reagents in ether using chlorobenzene as a reactant were unsuccessful for the preparation of phenyl magnesium chloride. In the past, resort was made to extreme conditions of high temperature and pressure for a long period but even under these conditions disappointing yields were obtained. Such processes were objectionable, not only because of the poor yields of the desired reagent, but also because of the formation of tars as by-products which were difficult to remove.

It is an object of the present invention economically to prepare phenyl magnesium chloride in high yield and purity by reacting chlorobenzene with magnesium at reflux temperatures of about 130–135° C. and presumably 130–132° C., in the presence of certain halide catalysts selected from the class consisting of $CCl_4$ and $SiCl_4$. It has been found that about 0.5–5% of the catalyst based on the weight of the magnesium is sufficient to effect catalysis of the reaction, 1%–2% being preferred.

The raw materials utilized in the present invention were standard commercial products. Furthermore, the magnesium utilized in the present invention did not necessarily possess a clean, unoxidized surface. The magnesium may be in the form of turnings (resulting from milling), granular material (produced on a hammermill), or in other comminuted forms. Similarly, the chlorobenzene was not a pure product but contained the usual impurities found in the commercial products. Since chlorobenzene is usually prepared from industrial coal tar benzene, it is expected that small amounts of chlorothiophene may be present in the commercial product. On analysis, the chlorobenzene was found to contain 0.18% sulfur. Likewise, the catalysts used in the present invention were ordinary untreated commercial products containing the usual impurities.

A feature of the present invention is the utilization of reflux temperatures of about 130–135° C. and preferably 130–132° C. at atmospheric pressure. This temperature range overcomes the disadvantages arising from the prior methods wherein superatmospheric pressures and higher temperatures were employed. The violent reaction which could ensue as a result of such severe conditions resulted in charring and in the formation of tars. With the present process, the reaction between chlorobenzene and magnesium is easily controlled. The non-exothermicity of this reaction, renders it necessary to apply heat in order to obtain reaction. It is possible by merely withdrawing the heat source to halt the reaction for a period of time after which further application of heat will permit the reaction to continue. As about ten to twenty hours is necessary in order to obtain complete reaction between the magnesium and chlorobenzene, the removal of the heating permits halting of the reaction when desired and its resumption at a future time.

Another embodiment of the present process resides in the advantageous use of a diluent or solvent during the reaction. It has been found that in the absence of a diluent, the reaction mixture becomes so viscous as to inhibit further reaction. It has also been found that charring may occur when no diluent is present during the reaction. This solvent may be present at the beginning of the reaction or may be added to the reaction mixture at any time after initiation of the reaction but before it has become unduly viscous. In view of the variety of catalysts and diluents useful herein, the last possible time for addition of the diluent and the quantities thereof must be determined separately for each material by simply observing the consistency of the mixture as the reaction progresses. Suitable solvents or diluents include chlorobenzene, benzene, toluene, xylene, phenyl ether, mixtures thereof and the like. If more than one mole of chlorobenzene per gram atom of magnesium is present in the reaction mixture, the excess chlorobenzene acts as a diluent and no other solvent need be added.

Another preferred embodiment of the present invention resides in carrying out the reaction under an inert atmosphere. Although this is not essential in the present process, the exclusion of air and its displacement by, for instance, nitrogen, helium, neon, krypton or argon results in a shorter initiation period. By initiation period is meant the time from the beginning of reflux to the time the reaction actually commences. This period can generally vary over a wide range, for example, from about twenty minutes to about five hours. However, when this reaction is carried out under nitrogen, an initiation period of only about twenty minutes to thirty-five minutes is observed as a result. Another deleterious effect of the oxygen in the air on the reagent is the formation of phenols as a result of air oxidation. Thus, while an inert atmosphere is not essential in the instant process, it does provide additional advantages in the obtention of phenyl magnesium chloride in higher purity.

Still another embodiment of the invention resides in efficient agitation of the reaction mixture. It has been found that stirring is essential to the obtention of a high yield of a pure product. The absence of agitation may result in charring, a considerably longer initiation period and consequently a less economical process. The degree of agitation, namely, the speed of stirrer, affects the rapidity of the reaction. More specifically, rapid agitation on the order of 10,000 R. P. M. allows the reaction to be complete three hours after reflux (130° C.), whereas slow stirring, on the order of 100–200 R. P. M. may require 20 hours after reflux starts for completion. Furthermore, with rapid agitation the reaction commences before reflux temperatures of about 130° C. are reached, reaction being noted at 110° C.–118° C. Rapid agitation reduces the reaction period and is advantageous where rapidity is a desirable feature, but it is not essential in the present invention.

The phenyl magnesium chloride yields obtained by this process range upward from 70% based on the weight of magnesium as compared to prior processes wherein a maximum of only 50% by weight of the magnesium has been obtained. This process affords a considerable saving, rendering the present process a superior procedure for the manufacture of the phenyl magnesium chloride reagent. In addition, the catalytic initiation of the reaction between magnesium and chlorobenzene is brought about uniformly in twenty to fifty minutes instead of the usual more lengthy period.

The following examples further illustrate the present invention, and it will be understood that the invention is not limited thereto:

Example I

One g. atom of magnesium turnings, 5.0 moles of commercial chlorobenzene, and 1% by weight of the magnesium of silicon tetrachloride were charged into a one liter, 3-necked flask equipped with a stainless steel anchor stirrer, reflux condenser, a thermometer, and a Glas-col heater. All joints were glass. This mixture was stirred and heated to reflux. Excess chlorobenzene was added about 3 hours after reflux started. Some time after reflux began, reaction, as indicated by a change in color, started. Heating was continued for 20 hours longer. The mixture was cooled, diluted with anhydrous ethyl ether and made up to one liter of solution in a volumetric flask by addition of more ether. The solution was shaken to disperse solids, allowed to settle for a moment, and a 20 ml. sample was pipetted into a 500 ml. Erlenmeyer flask containing 50 ml. water and 50 ml. of 0.5 N $H_2SO_4$. This mixture was heated on a steam bath for thirty minutes. 1.5 ml. of 0.04% bromocresol purple was used as an indicator for the back-titration with 0.2 N NaOH solution and the yield was calculated. This is the the well known Gilman titration, somewhat modified. The yield for this run was 74.6%.

Example II

One g. atom of magnesium turnings, 5.0 moles of commercial chlorobenzene, and 1% by weight of the magnesium of carbon tetrachloride were charged into a one liter, 3-necked flask equipped with a stainless steel anchor stirrer, reflux condenser, a thermometer, and a Glas-col heater. All joints were glass. This mixture was stirred and heated to reflux. Excess chlorobenzene was added 5 hours after reflux started. Some time after reflux began, reaction, as indicated by a change in color, started. Heating was continued for 20 hours longer. The mixture was cooled, diluted with anhydrous ethyl ether and made up to one liter of solution in a volumetric flask by addition of more ether. The solution was shaken to disperse solids, allowed to settle for a moment, and a 20 ml. sample was pipetted into a 500 ml. Erlenmeyer flask containing 50 ml. water and 50 ml. of 0.5 N $H_2SO_4$. This mixture was heated on a steam bath for thirty minutes. 1.5 ml. of 0.04% bromocresol purple was used as an indicator for the back-titration with 0.2 N NaOH solution and the yield was calculated. This is the well known Gilman titration, somewhat modified. The yield for this run was 84.5%.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A method of preparing phenyl magnesium chloride which comprises reacting chlorobenzene with magnesium at reflux temperatures in the presence of a catalytic amount of a halide catalyst selected from the class consisting of $CCl_4$ and $SiCl_4$, to form said phenyl magnesium chloride.

2. A method according to claim 1 wherein phenylmagnesium chloride is recovered.

3. A method of preparing phenyl magnesium chloride which comprises reacting chlorobenzene with magnesium at reflux temperatures in the presence of a diluent and a catalytic amount of a halide catalyst selected from the class consisting of $CCl_4$ and $SiCl_4$, to form said phenyl magnesium chloride.

4. A method according to claim 3, wherein phenylmagnesium chloride is recovered.

5. A method of preparing pnenyl magnesium chloride which comprises mixing chlorobenzene, magnesium and a catalytic amount of a halide catalyst selected from the class consisting of $CCl_4$ and $SiCl_4$, agitating and heating said mixture to reflux temperatures, maintaining said mixture at reflux temperatures by the application of heat until the reaction is complete, to form phenyl magnesium chloride.

6. A method according to claim 5, wherein phenylmagnesium chloride is recovered.

7. A process according to claim 6, wherein equimolar amounts of chlorobenzene and magnesium are employed, and wherein a diluent is added after the reaction has started but prior to the completion thereof.

8. A method of preparing phenyl magnesium chloride which comprises mixing equimolecular amounts of chlorobenzene and magnesium, and 0.5–5% by weight, based on magnesium of a chloride catalyst selected from the class consisting of $CCl_4$ and $SiCl_4$, agitating and heating said mixture to reflux temperatures, adding a diluent after the reaction has started but prior to completion thereof, maintaining said mixture at reflux temperatures by the application of heat until the reaction is complete, to form phenyl magnesium chloride.

9. A method of preparing phenyl magnesium chloride which comprises reacting chlorobenzene with magnesium at reflux temperatures and in an inert atmosphere in the presence of a catalytic amount of a halide catalyst selected from the class consisting of $CCl_4$ and $SiCl_4$, to form said phenyl magnesium chloride.

10. A method of preparing phenylmagnesium chloride which comprises reacting chlorobenzene with magnesium at reflux temperatures and under atmospheric pressure conditions, in the presence of catalytic amounts of a halide catalyst selected from the class consisting of $CCl_4$ and $SiCl_4$.

11. A method of preparing phenylmagnesium chloride which comprises reacting chlorobenzene with magnesium at reflux temperatures and under atmospheric pressure conditions, in the presence of from 0.5 to 5% by weight, based on magnesium of a halide catalyst selected from the class consisting of $CCl_4$ and $SiCl_4$.

12. A method of preparing phenylmagnesium chloride Grignard reagent which comprises reacting chlorobenzene with magnesium at a temperature of about 130 to 135° C. and under atmospheric pressure conditions, in the presence of about 0.5 to 5% by weight, based on magnesium of a halide catalyst selected from the class consisting of $CCl_4$ and $SiCl_4$.

References Cited in the file of this patent

UNITED STATES PATENTS

| | | |
|---|---|---|
| 2,056,822 | Britton et al. | Oct. 6, 1936 |
| 2,113,162 | Pier | Apr. 5, 1938 |
| 2,426,122 | Rust et al. | Aug. 19, 1947 |

OTHER REFERENCES

Reychler: Bulletin de Societe, Chimique de Paris, Trois-Serie, Tome 35 (1906), pages 803–811 (pages 803–807 only relied on).